United States Patent [19]

Lüllau

[11] Patent Number: 4,566,787
[45] Date of Patent: Jan. 28, 1986

[54] PHOTOCOPYING MACHINE

[76] Inventor: Georg Lüllau, Hofkamp 2, 2123 Bardowick, Fed. Rep. of Germany

[21] Appl. No.: 572,162

[22] Filed: Jan. 18, 1984

[30] Foreign Application Priority Data

Jan. 26, 1983 [DE] Fed. Rep. of Germany ....... 3302475

[51] Int. Cl.⁴ .............................................. G03B 27/30
[52] U.S. Cl. ....................................... 355/100; 355/97
[58] Field of Search ...................... 355/89, 27, 90, 78, 355/97, 98, 99, 100, 101, 102, 103, 104

[56] References Cited

U.S. PATENT DOCUMENTS

| | | | |
|---|---|---|---|
| 3,642,377 | 2/1972 | Young | 355/103 X |
| 3,661,457 | 5/1972 | Frectl | 355/103 X |
| 3,667,845 | 6/1972 | Leavitt et al. | 355/90 X |
| 4,380,389 | 4/1983 | Kingsley | 355/50 |

Primary Examiner—R. L. Moses
Attorney, Agent, or Firm—Prutzman, Kalb, Chilton & Alix

[57] ABSTRACT

A photocopying machine with a guide gap (20) formed between a plane rigid and light-transmitting plate (11) and a flexible cellular plate (7, 8). The flexible cellular plate is formed by an extremely low-friction flexible film (8) supported by a layer of flexible foam synthetic resin (7). The rigid plate (11) is covered by an extremely low-friction film (15). A pair of driving rollers (17,18) located on the introduction side and, if appropriate, a pair of driving rollers (24, 25) located on the outlet side serve exclusively as a feed element. The guide gap (20) directly adjoins the roller gap (19) of the pair of driving rollers (17, 18) located on the introduction side, because the parts forming the guide gap and in the form of a plurality of tongues (23) engaging into grooves (22) of the driving rollers (17, 18) are guided through the pair of driving rollers up to the introduction side (5, 13). A developing unit designed on the same construction principle can follow. To achieve longer exposure lengths, several photocopying units can be connected in succession.

10 Claims, 3 Drawing Figures

PHOTOCOPYING MACHINE

DESCRIPTION

The invention relates to a photocopying machine with a guide gap formed between a plane, rigid and light-transmitting plate and a flexible cellular plate, and with feed elements for the copy material which comprise one pair of driving rollers located in front of the guide gap and, if appropriate, another pair located behind it.

Photocopying machines with a plane guide gap for the copy material have been proposed to prevent the disadvantage, unavoidable when the guide path is curved, of dimensional displacement between the original and the copy (German Offenlegungsschrift No. 1,522,850; German Offenlegungsschrift No. 2,747,911; German Utility Model No. 1,976,447). However, this presents problems relating to the reliable transport of the copy material through the guide gap and uniform surface contact of the copy material. Perfect transport of the copy material depends on a uniform frictional grip between the copy material and the conveyor belts provided in the state of the art. Whereas where a curved guide path is concerned, the uniform pressing of the conveyor belts against the copy material, necessary for this frictional grip, occurs directly as a result of the curvature and longitudinal tension of the conveyor belts, when conveyor belts guided in a straight line are used this pressure has to be generated artificially by some pressure means, which can generally only act at certain points if a very high outlay in terms of construction is to be avoided. This puts at risk the uniformity of transport guidance and helps to produce undulations in the copy material. As regards uniform contact of the original on the copy free of any clearance over the complete surface, this is ensured directly when there is a curved path, without the need for any further pressure means besides the conveyor belts. In contrast to this, in the case of plane guidance of the copy material, it is necessary to provide special pressure means which act over the entire surface and which ensure that the original is laid against the copy uniformly at all points. In the state of the art mentioned, these pressure means are formed by a flexible cellular plate supported by rigid frame parts. Since the frame parts act on the flexible cellular plate only in certain places, it is not possible to generate a pressure which is uniform over the entire surface. On the contrary, the fear is that sufficient pressure occurs only wherever the flexible cellular plate is supported by the frame parts, whereas at a distance from these there is no guarantee that the sheets of copy material will be laid against one another free of clearance. Another fear is that in an effort to achieve sufficient contact even in the regions remote from the frame support the pressure applied by the flexible cellular plate will be set so high that excessive pressure seriously impeding the transport of the copy material will be exerted in the supported regions. Finally, it is not possible to exert any effect of the flexible cellular plate on the copy material in those regions in which the conveyor belts are located. All these properties of the known photocopying machine give rise to serious problems in terms of construction, without the associated dangers of inadequate transport together with the formation of undulations and insufficient contact between the original and the copy material being overcome satisfactorily.

In another known photocopying machine (German Utility Model No. 1,977,685), the rigid plate is curved only slightly and, to eliminate the danger of dimensional displacement, the two sheets of copy material each contain a lateral perforation, and these interact positively with feed elements of the photocopying machine and guarantee transport free of displacement. The feed elements are provided in front of and behind the roller gap, so that they can draw material in web form through the machine free of displacement. The guide gap in the exposure unit of the machine is formed, on the one hand, by the curved rigid glass plate and, on the other hand, by a pressure strip which, tensioned by a spring, rests on the glass plate and which is coated on the side facing the gap with polytetrafluoroethylene to minimize the friction. There are no feed elements in the guide gap. When copy material is introduced, its leading end is pressed with the fingers into the gap between the glass plate and the pressure strip, the latter being lifted off from the glass plate. As soon as the leading end of the copy material comes out of the guide gap at the rear, it can be introduced by hand into the following feed elements. This apparatus is suitable only for elongate copy material in strip form, such as tabular forms, because the insertion of the copy material is very complicated and the copy material itself requires a copy-free lead stage for insertion.

The object on which the invention is based is, therefore, to provide a photocopying machine of the type mentioned in the introduction, which allows plane copying free of dimensional displacement, with a high degree of reliability of plane contact between the original and the copy paper, and easy transport without restriction to elongate copy material.

According to the invention, this object is achieved because the two surfaces forming the guide gap and consisting of extremely low-friction material are guided up to the pair of driving rollers located in front of the guide gap and, in the form of tongues located in peripheral grooves of the driving rollers on both sides of the roller gap, through the pair of rollers and, in an introduction portion located in front of the pair of driving rollers, are at a distance from one another suitable for introducing copy material, and because the flexible cellular plate is formed by a flexible film pressed essentially over its entire surface against the rigid plate by a flexible supporting means.

Because the guide gap directly adjoins the roller gap as a result of the design of the tongues extending it up to the pair of driving rollers located at the front, and because the paper therefore has no opportunity to form undulations, and owing to the further feature that the surfaces of the guide gap are formed from extremely low-friction plastic, the copy material can be pushed through the guide gap by the pair of driving rollers, without requiring special transport elements in the guide gap. This is possible only because the pressure exerted within the guide gap to ensure a flat position of the copy material is reduced to an extreme degree. This reduction is only possible as a result of the effect exerted over the entire surface by the supporting means acting on the flexible film, without this contact over the entire surface being interrupted, for example, by guide channels for conveyor belts or the like.

It is very advantageous to design the flexible supporting means as a layer of foam synthetic resin which is arranged essentially over the entire surface on the side facing away from the film. However, the film can also be combined with another supporting means having a sufficiently uniform effect, for example with a plurality of springs which are closely arranged and therefore act practically uniformly over the entire surface, or with a means of subjecting a closed space located underneath the film to excess pressure, which can be achieved easily by means of the cooling fan because the pressure required is extremely low.

The use of an extremely low-friction plastic for forming the guide-gap surfaces also involves a special inventive step inasmuch as the extremely low-friction plastics available, such as preferably polytetrafluoroethylene and other polyfluorocarbons, cannot be obtained in a transparent state, but transmit light only diffusely. An average person skilled in the art of photocopying machines, who is accustomed to increasing the light output by always using for the plate located on the exposure side those materials which, such as plexiglas (R), give a maximum light output, must have had the greatest misgivings about the use of such a material which transmits light only diffusely. However, the lower light transmittance of extremely low-friction materials has, in practice, only a very slight effect, because they are used in only a very small layer thickness.

The film on the side of the guide gap facing away from the plate can consist completely, or at least on its side facing the guide gap, as a laminate of extremely low-friction material, such as preferably polytetrafluoroethylene, etc.

According to the invention, the guide gap directly adjoins the pair of rollers located in front of it, because this pair of rollers has peripheral grooves which are located opposite one another and into which engage tongues merging into the parts forming the guide gap. Of course, the parts forming the guide gap can themselves also form the tongues engaging into the peripheral grooves of the pair of rollers. In particular, according to the invention, the films forming the guide-gap surfaces, on the guide means, can be brought into the roller gap.

The transport of the copy material through the guide gap free of conveyor belts is naturally the easier, the shorter the guide gap in the direction of transport. If, whilst maintaining the advantages offered by a short roller gap, high copying speeds associated with long exposure stages are to be achieved, then, according to the invention, several photocopying units can be arranged in succession, with pairs of driving rollers being interposed. It is appropriate if, in this regard, the films forming the guide-gap surface in the successive photocopying units are each made in one piece through all the photocopying units, with cut-outs for the passage of the effective regions, located between the peripheral grooves, of the pairs of rollers.

The combination according to the invention, involving the use of low-friction guide-gap materials and uniform and low pressure forces over a large surface as well as guidance of the copy material which is accurate over a large surface, even makes it possible, according to a further feature of the invention, to arrange between the original and the copy a further light-transmitting film consisting of extremely low-friction material, such as particularly polytetrafluoroethylene, etc. In other words, special guide gaps are formed for the original, on the one hand, and for the copy, on the other hand, so that these can be further conveyed separately following the copying operation, without the need for a special separation device. This step of the invention is surprising inasmuch as it is not possible, for the reasons mentioned above, for the separating film to be transparent, but it is merely diffusely translucent, so that the copying quality could appear to be endangered, and also because it has hitherto been considered absolutely necessary to guide the two sheets of copy material so that they are directly in contact with one another, when exact congruence between the original and the copy has been required. It has been shown, however, that when a very thin intermediate film is used the copying quality is sufficient at least for the purposes of the textile industry (duplication of blanks) and similar purposes. And it has also been shown that the common drive of the two sheets by the transport rollers located in front of the guide gap is sufficient for the synchronism required to ensure congruence.

In a photocopying machine, a photocopying unit is often combined with a developing unit. This is also possible within the scope of the invention, and the same guide and transport principle can be adopted for the developing unit as for the exposure unit. The web to be developed is pressed through a guide gap, formed between extremely low-friction films, by two transport rollers located in front of it, at least one of the two films having perforations to allow passage of the developing gas.

The invention is explained in more detail below with reference to the drawing which illustrates an advantageous exemplary embodiment and in which.

Figure 1:
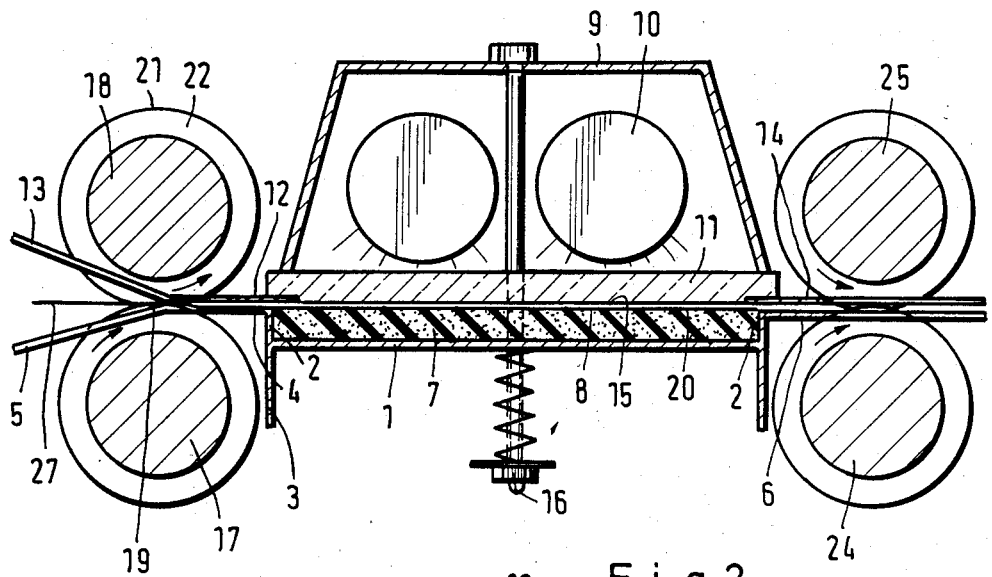
FIG. 1 shows a cross-section through a first embodiment.
Figure 2:
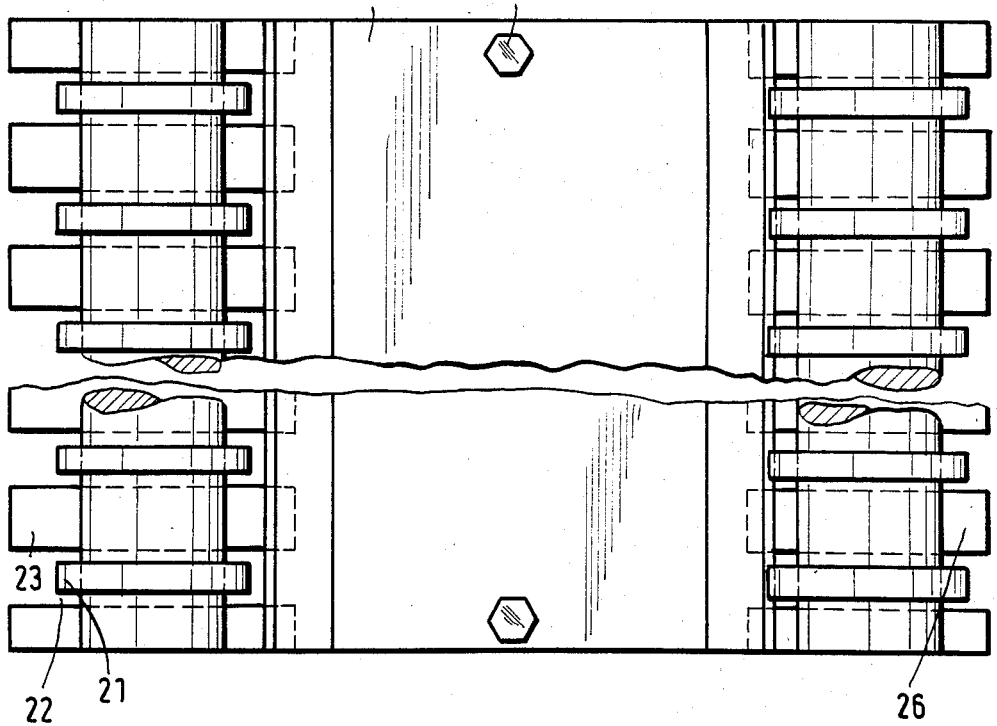
FIG. 2 shows a plan view of the embodiment according to FIG. 1.

In the embodiment according to FIGS. 1 and 2, there is located in a horizontal position in a machine stand, not shown in any more detail, a rigid plate 1 which has edges 2 projecting upwards at the longitudinal edges extending transversely to the direction of passage of the copy material. A further profiling 3 can be provided for reinforcement purposes. The edge 2 on the infeed side (on the left in the drawing) has adjoining it, in a somewhat higher plane than the plate 1, a horizontal flange 4 which is longitudinally continuous and which has further forwards an introduction portion 5 which is angled downwards slightly. A corresponding flange 6 is provided at the edge 2 on the delivery side at the same height as the flange 4.

On the plate 1 fixed in the machine stand rests a foam layer 7 consisting of flexible cellular material, the thickness of which is only slightly higher than the surface of the flanges 4 and 6. Located on this is a polytetrafluoroethylene film 8 which is also bonded to the surfaces of the flanges 4 and of the introduction portion 5 and which extends essentially plane and tensioned in the longitudinal and transverse directions. The plate 1 together with the associated parts, the foam layer 7 and the film 8 form the bottom part of the photocopying unit. The top part is mainly formed by the exposure box 9 with the lamps 10 and the glass plate 11 which closes off the exposure box 11 at the bottom and the dimensions of which are essentially the same as those of the plate 1. A polytetrafluoroethylene film 12 rests on the plane lower surface of the glass plate 11. The lower surface of the glass plate 11 is continued on the introduction side by a metal plate 12 which is in line with it and which has an introduction portion 13 corresponding to the introduction portion 5 of the lower flange and bent upwards a little. A corresponding metal plate 14 also adjoins the lower surface of the glass plate 11 on the outlet side. A polytetrafluoroethylene film 15 rests continuously not only on the lower surface of the glass plate 11, but also on the lower surfaces of the parts 12, 13 and 14, so that a continuous guide gap is formed between the films 8 and 15 from the introduction side to the outlet side.

The exposure box 9 with the parts associated with it rests on the bottom part of the photocopying unit under its own weight which can, if desired, be increased or reduced by means of a spindle-and-spring arrangement 16. The polytetrafluoroethylene film 15 kept flat on the glass plate 11 presses on the polytetrafluoroethylene film 8 and keeps this in a likewise flat position against the resistance of the foam layer 7 which endeavors to arch the polytetrafluoroethylene film 8 upwards.

In the introduction region formed by the flange 4, the metal plate 12 and the introduction portions 5, 13, there acts a pair of rollers 17, 18, the roller cap 19 of which is aligned with the guide gap 20 between the films 8 and 15. The two rollers have annular projections 21 which alternate in an axial direction and which constitute the effective surfaces for forming the roller gap, and have grooves 22. The annular projections 21 and the annular grooves 22 are located exactly opposite one another respectively. The flange 4 together with the introduction portion 5 and the metal plate 12 together with the introduction portion 13 are designed in the manner of a comb with a plurality of tongues 23 which engage respectively into the grooves 22. The introduction portions 5 and 13 are located in front of the roller gap in the introduction direction (arrow). At the latest in the roller gap, the flange 4 and the metal plate 12 start to come up against one another in parallel plane alignment. The pair of rollers 17, 18 is driven, appropriately with the lower roller 17 being driven directly, whilst the roller 18 rotates with it by bearing on it as a result of its own weight.

Located on the delivery side is a pair of rollers 24, 25 which is identical to the pair of rollers 17 and 18 in the arrangement relative to the roller gap. The flanges 6, 14 which rest against one another preferably in a parallel plane alignment are composed of tongues 26 which engage respectively into the groove portions of the pair of rollers.

When the copy material consisting of the original and copy paper is introduced into the introduction portion 5, 13, it is grasped by the pair of rollers 17, 18 and pushed into the guide gap 20, and the elements forming the roller gap give way according to the thickness of the copy material, the latter being conveyed further constantly parallel to itself. Because of the smoothness of the material forming the guide gap and because of the constantly plane guidance which it ensures and which is also guaranteed between the pair of rollers 17, 18 and the start of the actual exposure stage, the material cannot bulge or tend to form folds at any point. Although the rigidity inherent in it is slight, this is sufficient to press it through the guide gap against the frictional resistance until it is grasped by the rollers 24, 25 located on the delivery side.

If desired, the pair of rollers 24, 25 located on the delivery side can be followed by a further exposure stage which has exactly the same design as that shown in the illustration, so that the pair of rollers 24, 25 functions as a pair of introduction rollers for this subsequent exposure stage. Even further exposure stages can be added accordingly.

The oversize of the foam layer 7 in relation to the height of the edges 2 can easily be adjusted so that just the minimum pressure necessary to keep the copy material parallel over its entire surface is achieved, with the result that it cannot bulge even slightly at any point under the pushing force and then crumple.

The length of an exposure unit between the pair of rollers located on the introduction side and that located on the delivery side can be selected at around 10 to 20 cm and, if appropriate to optimize the friction and pressure conditions or when stiffer copy material is used, can be made even longer.

Figure 3:
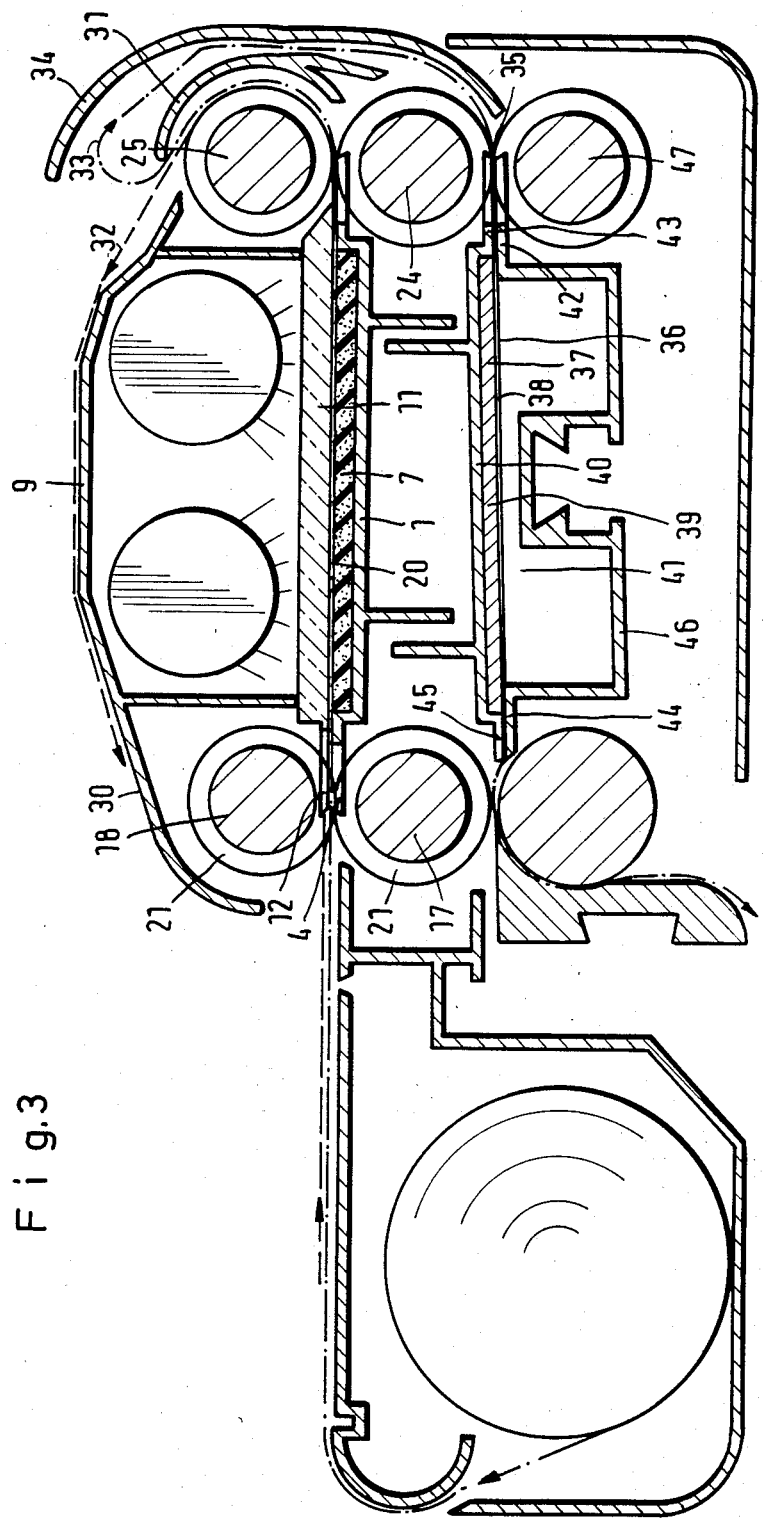
FIG. 3 shows a cross-section through a second embodiment.

The exemplary embodiment according to FIG. 3 has an exposure unit in the upper region and a developing unit in the lower region.

The developing unit has a design very similar to that explained with reference to FIGS. 1 and 2. The same parts bear the same reference numerals and are not described in any more detail.

The glass plate 11 as such is taken into the region of the pair of introduction rollers 17, 18 and forms in the roller gap the start of the guide gap. To protect the roller 18, the hood 9 is drawn out over this at 30. The plate 1 is reinforced by means of several ribs. At the delivery end of the guide gap, the copy material is received by a deflection plate 31 and guided upwards to a point where the two sheets can be separated by hand, so that the original sheet is taken away in the direction of the arrow 32 and the copy paper is pushed according to the arrow 33 into an orifice which is formed between the guide plate 31 and a further guide plate 34 and from which it is guided by the guide plate 34 to the introduction 35 of the developing machine.

The developing machine contains a guide gap 36 formed between two polytetrafluoroethylene films 37, 38 one of which is supported, in the way described above with reference to the photocopying machine, by a plane horizontal plate 40 via a flexible plastic foam layer 39, whilst the other closes off the ammonia compartment 41 of the developing machine, with or without support by a corresponding plate. The polytetrafluoroethylene film 38 facing the ammonia compartment is perforated, slotted or otherwise made suitable for the passage of the developing gas. The same applies to the plate which, if appropriate, supports this film.

Flanges 42, 43 and 44, 45 form the closures of the guide gap on the introduction and outlet sides, respectively, are connected to the ammonia box 46 and the plate 40, respectively, and are covered continuously with the polytetrafluoroethylene films 37, 38.

Located on the introduction side of the developing machine is a pair of rollers which is formed on the one hand by the roller 24 on the outlet side of the photocopying side and by a further roller 47. A corresponding pair of rollers, in which the roller 21 on the introduction side of the photocopying machine can also participate, can also be provided on the outlet side of the developing machine, although this is generally not necessary here.

The mode of operation of the machine emerges directly as a result its design. The developing material is introduced into the roller gap of the pair of rollers 17, 18 and pushed by this through the guide gap 20. Whereas the original sheet is removed at 32, the copy sheet is deflected by hand according to the arrow 33 towards the developing machine and can be removed from this on the front side of the machine.

When a third polytetrafluoroethylene film is inserted between the polytetrafluoroethylene films forming the guide gap of the photocopying machine and designated by reference numerals 8, 15 in FIG. 1, separate guide gaps for the two sheets of copy material are formed. This third film is extended on the introduction side beyond the roller gap between the rollers 17, 18, so that separate introduction portions are formed for the original sheet and the sheet of copy paper. In the region of the pairs of rollers 17, 18 and 24, 25, it contains cut-outs in the region of the annular projections 21, so that these can interact and grasp the two sheets in direct contact with one another. This third polytetrafluoroethylene film serving as a separating film is then taken further between the roller 25 and the guide plate 31, so that the two sheets also emerge separately from the photocopying unit, and finally the sheet of copy paper can also automatically pass from the separating film into the guide region between the guide plates 31 and 34, so as to be developed subsequently. This separating film can also be replaced by a plurality of separating strips or separating threads.

The pressure appropriately exerted in the photocopying machine by the resiliently supported film on the firmly supported film is appropriately between 3 and 20 kgf/m² and preferably not more than 10 kgf/m².

I claim:

1. A photocopying machine comprising a plain rigid light-transmitting plate (11), a flexible cellular plate (7) spaced from the light-transmitting plate to form a guide gap (20) therebetween, the surfaces forming the guide gap consisting of extremely low-friction material, feed elements comprising a pair of driving rollers (17, 18) for feeding copy material to the guide gap, said driving rollers forming a roller gap (19) therebetween and having peripheral grooves (22) selectively enlarging portions of the roller gap, and guide gap extenders (4, 12) having tongues (5, 13) projecting through said roller gap at said grooves, said tongues on opposite sides of said guide gap being spaced sufficiently for introducing copy material to said roller gap, said cellular plate including a flexible film (8) and flexible supporting means urging said film toward the light-transmitting plate over its entire surface.

2. A photocopying machine as claimed in claim 1, wherein the flexible supporting means (7) is a layer of foam synthetic resin which is supported essentially over its entire surface on the side facing away from the film (8).

3. A photocopying machine as claimed in claim 1, wherein the surface of the plane plate (11) is covered by a film (15) which consists, at least on its side facing the guide gap (20), of the extremely low-friction plastic.

4. A photocopying machine as claimed in claim 1, wherein the flexible film (8) consists, at least on its side facing the guide gap, of the extremely low-friction plastic.

5. A photocopying machine as claimed in claim 1, wherein the grooves (22) formed in the pair of driving rollers (17, 18) are located opposite one another.

6. A photocopying machine as claimed in claim 1 wherein the surface of the light-transmitting plate (11) is covered by a film (15) which consists, at least on its side facing the guide gap (20), of an extremely low-friction plastic, and said flexible film (8) of the cellular plate also consists, at least on its side facing the guide gap of the extremely low-friction plastic, said grooves (22) formed in the driving rollers (17, 18) being located opposite one another, a portion of the low-friction material of said films (8, 15) forming the surface of the guide gap (20) extending over said tongues (23).

7. A photocopying machine as claimed in one of claims 1, wherein several photocopying units are connected in succession, with pairs of driving rollers being between the units.

8. A photocopying machine as claimed in claim 7, wherein the films forming the guide gap surface in the successive photocopying units are each made in one piece through all the photocopying units, with cut-outs for the passage of the effective regions, located between the peripheral grooves, of the pairs of rollers.

9. A photocopying machine as claimed in claim 1 (1 or 2) wherein an additional film consisting of extremely low-friction plastic is contained between the guide-gap surfaces to form two separate guide gap portions, one of said gap portions being suited for receiving an original sheet and the second portion being suited for receiving a sheet of copying material, said additional film projecting through said roller gap at said grooves.

10. A photocopying machine as claimed in claim 1 including a developing device having a pair of extremely low-friction films (37, 38) forming a developing guide gap (36) for receiving the material to be developed, a developing feed element including a pair of developer drive rollers (24, 27) located on the upstream side of said developing gap, one of said films being perforated and the other of said film being supported by a layer of flexible foam synthetic resin (39) which is itself supported essentially over its entire surface and a developing compartment communicating with said perforated film.

* * * * *

UNITED STATES PATENT AND TRADEMARK OFFICE
CERTIFICATE OF CORRECTION

PATENT NO. : 4,566,787
DATED : Jan. 28, 1986
INVENTOR(S) : Georg Lullau

It is certified that error appears in the above-identified patent and that said Letters Patent is hereby corrected as shown below:

Column 8, line 23, delete "one of"

Column 8, line 26, before "between" insert "interposed"

Signed and Sealed this

Twenty-second Day of July 1986

[SEAL]

Attest:

DONALD J. QUIGG

Attesting Officer

Commissioner of Patents and Trademarks